US010129397B1

(12) United States Patent
Keiser et al.

(10) Patent No.: US 10,129,397 B1
(45) Date of Patent: Nov. 13, 2018

(54) INBOUND CALLS TO INTELLIGENT CONTROLLED-ENVIRONMENT FACILITY RESIDENT MEDIA AND/OR COMMUNICATIONS DEVICES

(71) Applicant: Securus Technologies, Inc., Carrollton, TX (US)

(72) Inventors: Luke Keiser, Frisco, TX (US); Scott Passe, Forney, TX (US); Krishna Balantrapu, Irving, TX (US); Alexander Noland, North Richland Hills, TX (US); Jamie Nicole Wade, Denton, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/660,670

(22) Filed: Jul. 26, 2017

Related U.S. Application Data

(63) Continuation-in-part of application No. 15/238,411, filed on Aug. 16, 2016, now Pat. No. 9,742,910,
(Continued)

(51) Int. Cl.
*H04M 1/56* (2006.01)
*H04M 15/06* (2006.01)
(Continued)

(52) U.S. Cl.
CPC ......... *H04M 3/4365* (2013.01); *H04M 7/003* (2013.01); *H04M 3/2281* (2013.01);
(Continued)

(58) Field of Classification Search
CPC ......... H04L 51/12; H04L 51/28; H04L 51/00; H04L 12/58; H04M 3/2281; H04M 15/10;
(Continued)

(56) References Cited

U.S. PATENT DOCUMENTS 5,926,533 A 7/1999 Gainsboro
6,611,583 B1 8/2003 Gainsboro
(Continued)

OTHER PUBLICATIONS

Exhibit 24, Screening Out Family Time: The For-Profit Video Visitation Industry in Prisons and Jails, Portsmouth County, Virginia HomeWAV Contract and Brochure, Jun. 6, 2012, 7 Pages.
(Continued)

*Primary Examiner* — Binh Kien Tieu
(74) *Attorney, Agent, or Firm* — Fogarty LLP

(57) ABSTRACT

An inbound controlled-environment facility resident call server may route a non-resident inbound call to a controlled-environment facility resident media and/or communications device. The called resident device may confirm that the non-resident is associated with an Address Identifier (AID) of that resident device. The resident device may also receive data for verifying authentication of the resident operating the device, verify authentication of the resident operating the device, and verify that the resident operating the device is associated with the AID. The inbound resident call server, or the called resident device itself, may connect the inbound call to the called resident device in response to the device authenticating the non-resident is associated with the AID, verifying authentication of the resident operating the device, and verifying that the resident operating the device is associated with the AID.

26 Claims, 5 Drawing Sheets

Related U.S. Application Data which is a continuation of application No. 14/872,953, filed on Oct. 1, 2015, now Pat. No. 9,420,094.

(51) Int. Cl.

| | | |
|---|---|---|
| *H04M 3/436* | (2006.01) | |
| *H04M 7/00* | (2006.01) | |
| H04M 3/493 | (2006.01) | |
| H04M 3/42 | (2006.01) | |
| H04M 15/00 | (2006.01) | |
| H04M 3/22 | (2006.01) | |

(52) U.S. Cl.
CPC .... *H04M 3/42221* (2013.01); *H04M 3/42374* (2013.01); *H04M 3/4931* (2013.01); *H04M 15/8005* (2013.01); *H04M 15/8083* (2013.01)

(58) Field of Classification Search
CPC ............... H04M 15/887; H04M 17/10; H04M 2203/6018; G06Q 20/00; G06Q 20/40145; G07C 9/00158; G07C 9/00166; G10L 15/26
USPC ..... 379/63.02, 93.03, 93.05, 100.03, 100.05, 379/102.01, 102.02, 142.01, 142.04, 379/142.06, 142.07, 142.17, 188, 196, 379/199, 201.01, 207.07, 203.01, 206.01, 379/207.13, 207.15, 210.02
See application file for complete search history.

(56) References Cited

U.S. PATENT DOCUMENTS

| | | | |
|---|---|---|---|
| 6,665,380 B1 | 12/2003 | Cree et al. | |
| 7,058,163 B1* | 6/2006 | Parekh | H04M 3/42221 |
| | | | 379/68 |
| 7,256,816 B2 | 8/2007 | Profanchik et al. | |
| 7,496,345 B1 | 2/2009 | Rae et al. | |
| 7,697,667 B1 | 4/2010 | Wageman et al. | |
| 8,064,580 B1 | 11/2011 | Apple et al. | |
| 8,190,121 B2 | 5/2012 | Smith et al. | |
| 8,295,446 B1 | 10/2012 | Apple et al. | |
| 8,478,234 B1* | 7/2013 | Byrne | H04M 3/2281 |
| | | | 455/406 |
| 8,489,068 B1 | 7/2013 | Edwards et al. | |
| 8,577,003 B2 | 11/2013 | Rae | |
| 8,582,738 B1 | 11/2013 | Keiser | |
| 8,761,353 B1 | 6/2014 | Apple et al. | |
| 8,976,949 B2 | 3/2015 | Torgersrud et al. | |
| 9,020,115 B2 | 4/2015 | Hangsleben | |
| 9,094,569 B1 | 7/2015 | Humphries | |
| 9,106,789 B1 | 8/2015 | Shipman, Jr. et al. | |
| 9,113,131 B1 | 8/2015 | Passe et al. | |
| 9,124,763 B2 | 9/2015 | Humphries | |
| 9,225,701 B2 | 12/2015 | Gongaware et al. | |
| 9,282,188 B2 | 3/2016 | Hodge et al. | |
| 9,288,439 B2 | 3/2016 | Bloms et al. | |
| 9,307,386 B2 | 4/2016 | Hodge et al. | |
| 9,473,497 B1 | 10/2016 | Smith | |
| 9,729,709 B1 | 8/2017 | Edwards et al. | |
| 9,742,910 B2 | 8/2017 | Keiser et al. | |
| 9,832,313 B1* | 11/2017 | Way | H04M 3/436 |
| 2001/0026609 A1 | 10/2001 | Weinstein et al. | |
| 2003/0046083 A1* | 3/2003 | Devinney, Jr. | G06Q 20/00 |
| | | | 704/273 |
| 2003/0174823 A1 | 9/2003 | Justice et al. | |
| 2003/0174826 A1 | 9/2003 | Hesse | |
| 2003/0193961 A1 | 10/2003 | Moore et al. | |
| 2003/0198325 A1 | 10/2003 | Bayne | |
| 2005/0265529 A1 | 12/2005 | Hogg, Jr. et al. | |
| 2006/0173781 A1 | 8/2006 | Donner | |
| 2006/0256940 A1 | 11/2006 | Pekarovic et al. | |
| 2007/0041517 A1* | 2/2007 | Clarke | H04M 1/67 |
| | | | 379/67.1 |
| 2007/0263812 A1 | 11/2007 | Polozola et al. | |
| 2008/0040780 A1 | 2/2008 | Reinhold | |
| 2008/0057976 A1 | 3/2008 | Rae et al. | |
| 2008/0220739 A1 | 9/2008 | Muoio et al. | |
| 2010/0189228 A1 | 7/2010 | Seyfetdinov | |
| 2011/0317685 A1 | 12/2011 | Torgersrud et al. | |
| 2012/0262271 A1* | 10/2012 | Torgersrud | G06F 21/32 |
| | | | 340/5.53 |
| 2013/0023247 A1 | 1/2013 | Bolon et al. | |
| 2013/0194377 A1 | 8/2013 | Humphries | |
| 2013/0263227 A1* | 10/2013 | Gongaware | H04L 63/08 |
| | | | 726/4 |
| 2013/0311180 A1 | 11/2013 | Amison | |
| 2014/0080443 A1 | 3/2014 | Smith et al. | |
| 2014/0106699 A1 | 4/2014 | Chitre et al. | |
| 2014/0192132 A1 | 7/2014 | Avery et al. | |
| 2014/0218466 A1 | 8/2014 | Bloms et al. | |
| 2014/0219432 A1 | 8/2014 | Bengston et al. | |
| 2014/0267547 A1 | 9/2014 | Torgersrud et al. | |
| 2014/0287715 A1 | 9/2014 | Hodge et al. | |
| 2015/0050910 A1 | 2/2015 | Torgersrud | |
| 2015/0078541 A1 | 3/2015 | Hodge | |
| 2015/0207927 A1 | 7/2015 | Torgersrud et al. | |
| 2015/0215254 A1* | 7/2015 | Bennett | H04L 51/12 |
| | | | 709/206 |
| 2015/0256671 A1 | 9/2015 | Torgersrud et al. | |
| 2015/0319612 A1 | 11/2015 | Hodge | |
| 2016/0007201 A1 | 1/2016 | Torgersrud et al. | |
| 2016/0066182 A1 | 3/2016 | Hodge et al. | |
| 2016/0078281 A1* | 3/2016 | Gongaware | H04L 63/08 |
| | | | 382/118 |
| 2016/0088481 A1* | 3/2016 | Byrne | H04W 12/00 |
| | | | 455/411 |
| 2016/0119580 A1* | 4/2016 | Torgersrud | H04N 7/147 |
| | | | 348/14.01 |
| 2016/0191850 A1 | 6/2016 | Humphries | |
| 2016/0328894 A1 | 11/2016 | Zhang | |
| 2017/0093832 A1 | 3/2017 | Schwartz et al. | |
| 2017/0195494 A1* | 7/2017 | Bengston | H04M 7/0012 |
| 2017/0208468 A1 | 7/2017 | Hodge et al. | |
| 2017/0221287 A1* | 8/2017 | Robinson | G06K 7/1417 |
| 2017/0331947 A1* | 11/2017 | Hodge | H04M 3/2281 |
| 2017/0346940 A1 | 11/2017 | Hodge et al. | |
| 2018/0159972 A1* | 6/2018 | Hodge | H04W 4/24 |

OTHER PUBLICATIONS

U.S. Appl. No. 15/238,411, Non-Final Office Action dated Nov. 15, 2016, 12 pages.

* cited by examiner

INBOUND CALLS TO INTELLIGENT CONTROLLED-ENVIRONMENT FACILITY RESIDENT MEDIA AND/OR COMMUNICATIONS DEVICES

CROSS-REFERENCE TO RELATED APPLICATION

This is a continuation in part of, and claims benefit of, U.S. patent application Ser. No. 15/238,411, also entitled Inbound Calls to Intelligent Controlled-Environment Facility Resident Media and/or Communications Devices, filed Aug. 16, 2016 and issued as U.S. Pat. No. 9,742,910 on Aug. 22, 2017, and therethrough claims benefit of, to U.S. patent application Ser. No. 14/872,953, also entitled Inbound Calls to Intelligent Controlled-Environment Facility Resident Media and/or Communications Devices, filed Oct. 1, 2015 and issued as U.S. Pat. No. 9,420,094 on Aug. 16, 2016, all of which are hereby incorporated herein by reference.

TECHNICAL FIELD

The present disclosure relates generally to controlled-environment facilities, more particularly to communications with residents of controlled-environment facilities, and specifically to inbound phone and video calls to intelligent controlled-environment facility resident media and/or communications devices, wherein authentication is provided by the called controlled-environment facility resident media and/or communications device.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions.

Traditional communication services provide residents (inmates) of controlled-environment facilities (such as correctional facilities) the ability to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to perform investigations with respect to their own inmates.

SUMMARY

The present invention is directed to systems and methods, which provide handling of inbound calls to resident (e.g. inmate) media and/or communications devices. Such a system may include an inbound resident call server, an authenticating server, and/or the like. The authenticating server may be a part of the inbound resident call server, or the like, in some implementations.

The inbound resident call server may be adapted to host inbound calling accounts established by non-residents and receive inbound calls from such non-residents. The inbound calls may be routed to the authenticating server by the inbound resident call server. The authenticating server may be adapted to authenticate that a non-resident is associated with an inbound calling account and confirm that the inbound calling account is associated with an address identifier of the resident media and/or communications device the non-resident is calling. The authenticating server may also receive, such as via the called resident media and/or communications device, a personal identification number associated with the resident the inbound call is directed to and may verify that the personal identification number is associated with the address identifier of the resident media and/or communications device. The inbound resident call server may also confirm that the resident media and/or communications device is active and connect the inbound resident call system with the resident media and/or communications device in response to confirming that the resident media and/or communications device is active, or alternatively, inform the non-resident the resident is not available for the inbound call in response to failure to confirm that the resident media and/or communications device is active. Thereupon, the inbound resident call server may connect the non-resident inbound call with the resident media and/or communications device, such as, as a result of the authenticating server authenticating that the non-resident is associated with the inbound calling account, confirming that the inbound calling account is associated with an address identifier of the resident media and/or communications device and verifying that the personal identification number is associated with the address identifier of the resident media and/or communications device.

In some implementations, the inbound call from the non-resident may be directed to the resident media and/or communications device and the inbound resident call server may, in such cases intercept the inbound call. Additionally, or alternatively, the inbound resident call server, or the like may host a central phone number for calls directed to resident media and/or communications devices, and in such implementations, inbound calls from non-residents may be directed to the central phone number and the inbound resident call server may accept requests from non-residents for calls into residents and/or more specifically into a particular resident's media and/or communications device.

Various other features provided in accordance with assorted implementations of the present systems and methods may include the following. A flat fee or time-based fee may be charged for the inbound call and/or a subscription fee may (periodically) be charged following establishment of the inbound calling account for the non-resident, such as from an inbound calling account of the non-resident. The inbound call may be monitored, such as for impermissible activity, keywords, or the like. The inbound call may also be tracked and/or recorded, and resulting recordings may be stored (and tracked). Also, a determination may be made as to whether the non-resident is on a personal allowed number list and/or a pre-approved contact list associated with the resident associated with the resident and/or the called media and/or communications device.

In alternative embodiments, where authentication is carried out by a called controlled-environment facility resident media and/or communications device, the inbound controlled-environment facility resident call server may route a non-resident inbound call to a controlled-environment facility resident media and/or communications device. The called resident media and/or communications device may confirm that the non-resident is associated with an AID of that resident device. The resident device may also receive data for verifying authentication of the resident operating the resident device, verify authentication of the resident operating the resident device using that data, and verify that the resident operating the resident device is associated with the AID of the resident device. The inbound resident call server, or the called resident device itself, may connect the non-resident inbound call to the called resident device in response to the called resident device authenticating that the non-resident is associated with the AID of the called resident device, verifying authentication of the resident operating the called resident device, and verifying that the resident operating the called resident device is associated with the AID of the called resident device.

In some implementations, the called resident media and/or communications device may have received the data for verifying authentication of the resident operating the called resident device, verified authentication of the resident operating the called resident device and/or verified that the resident operating the called resident device is associated with the AID of the called resident device, prior to the inbound call being routed to the called resident device. In such implementations, the called resident device may, such as in response to the inbound call being routed to the called resident device, receive the same or different data for re-verifying authentication of the resident operating the called resident device, re-verify authentication of the resident operating the called resident device, and/or re-verify that the resident operating the called resident device is associated with the AID of the called resident device.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
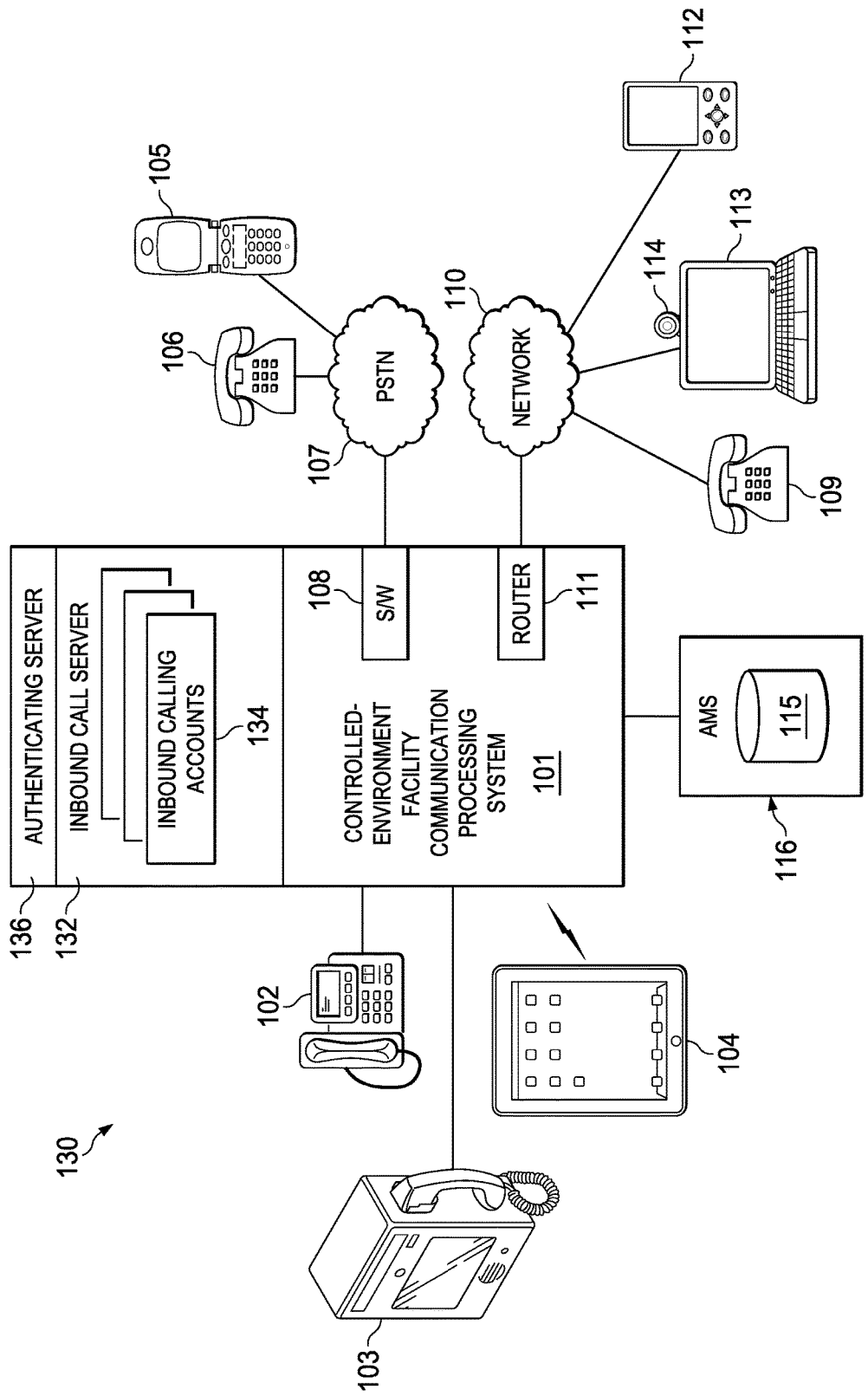
Figure 2:
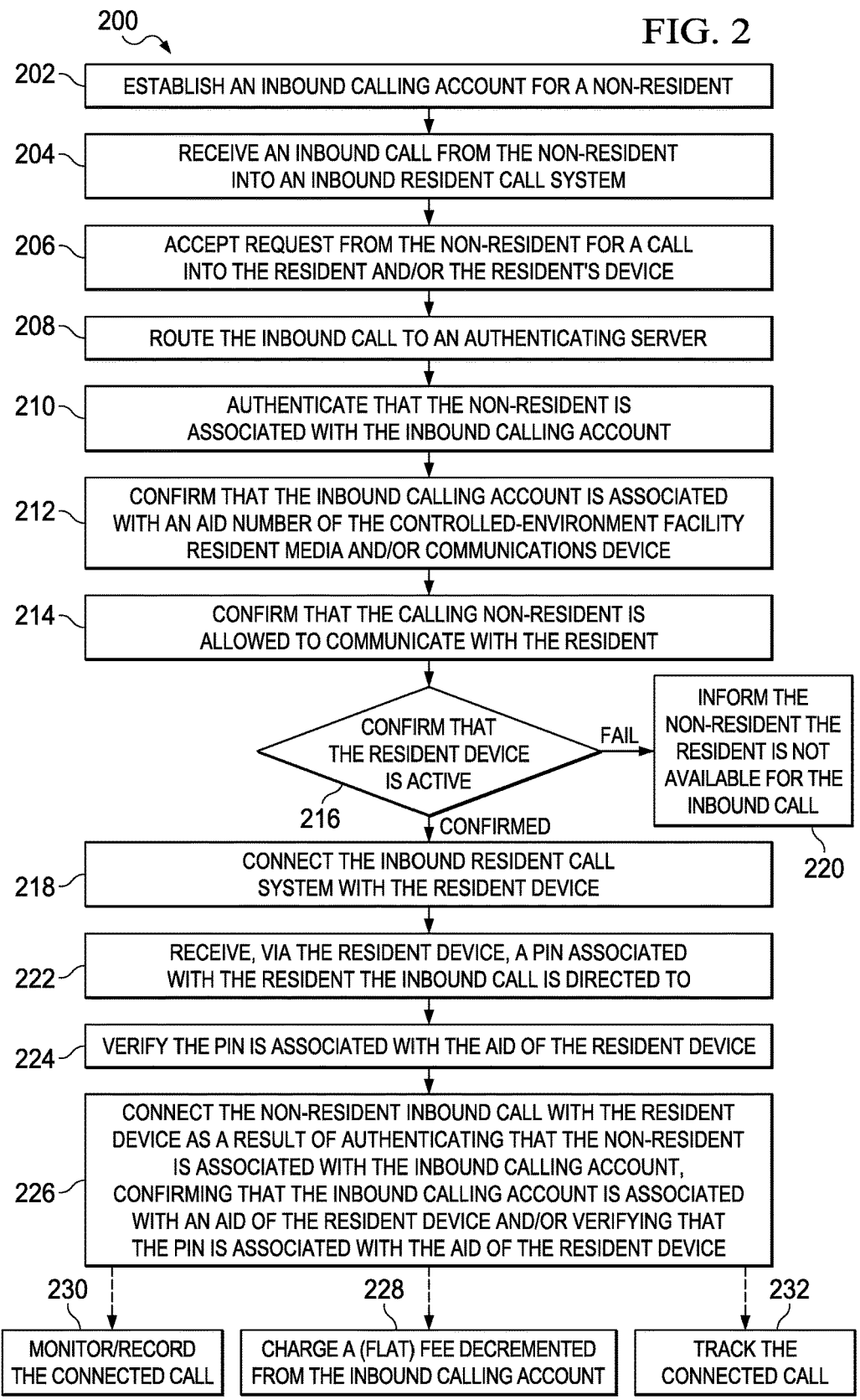
Figure 3:
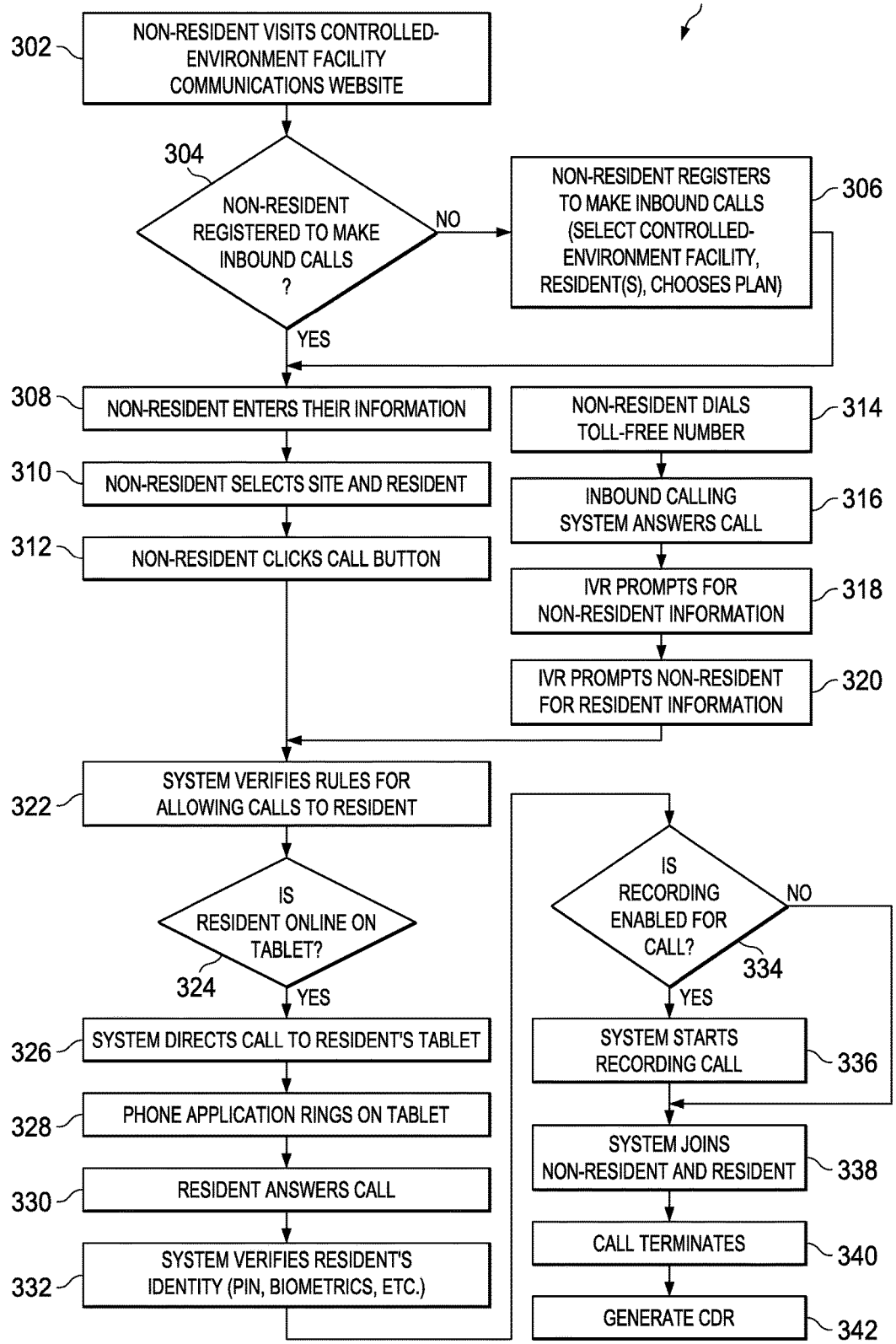
Figure 4:
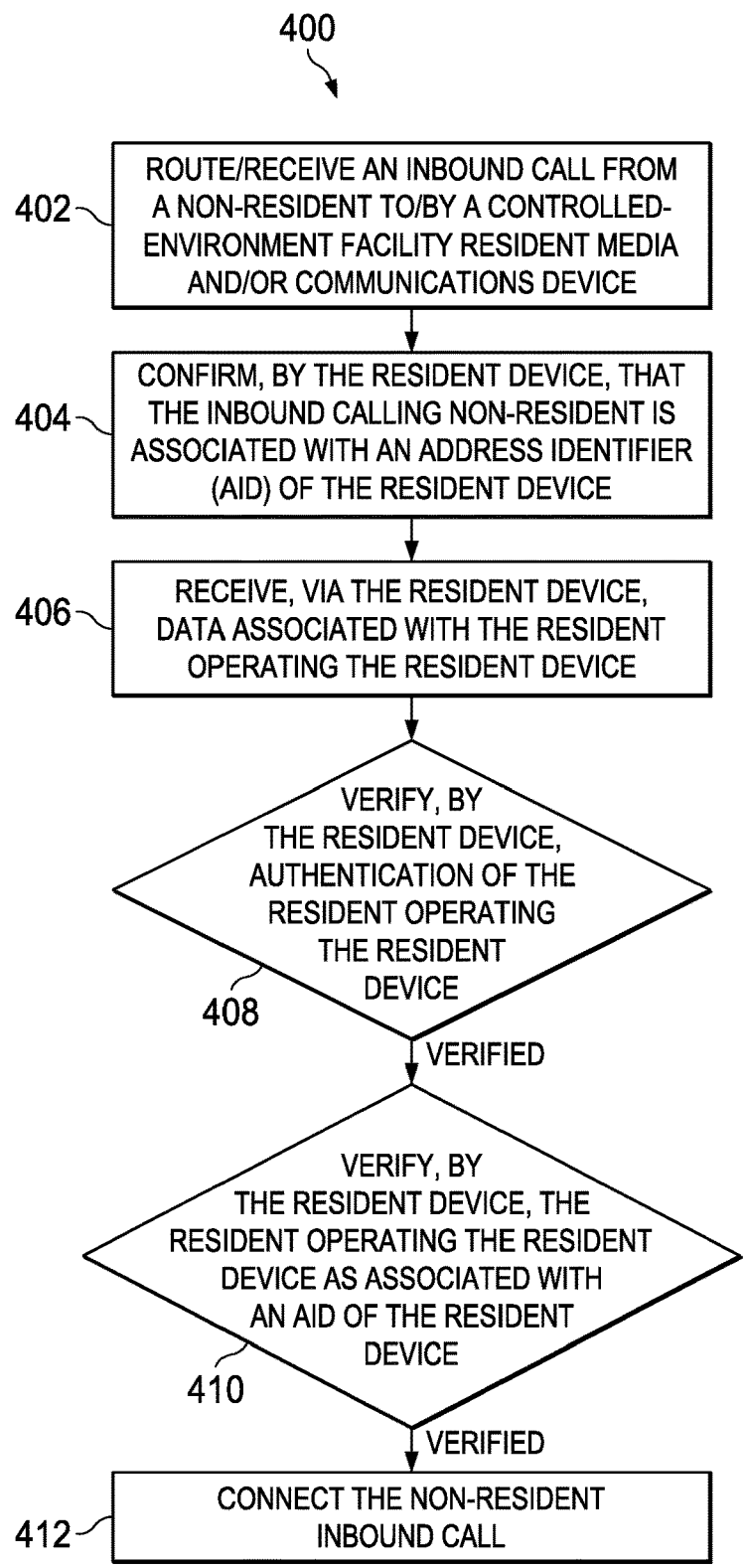
Figure 5:
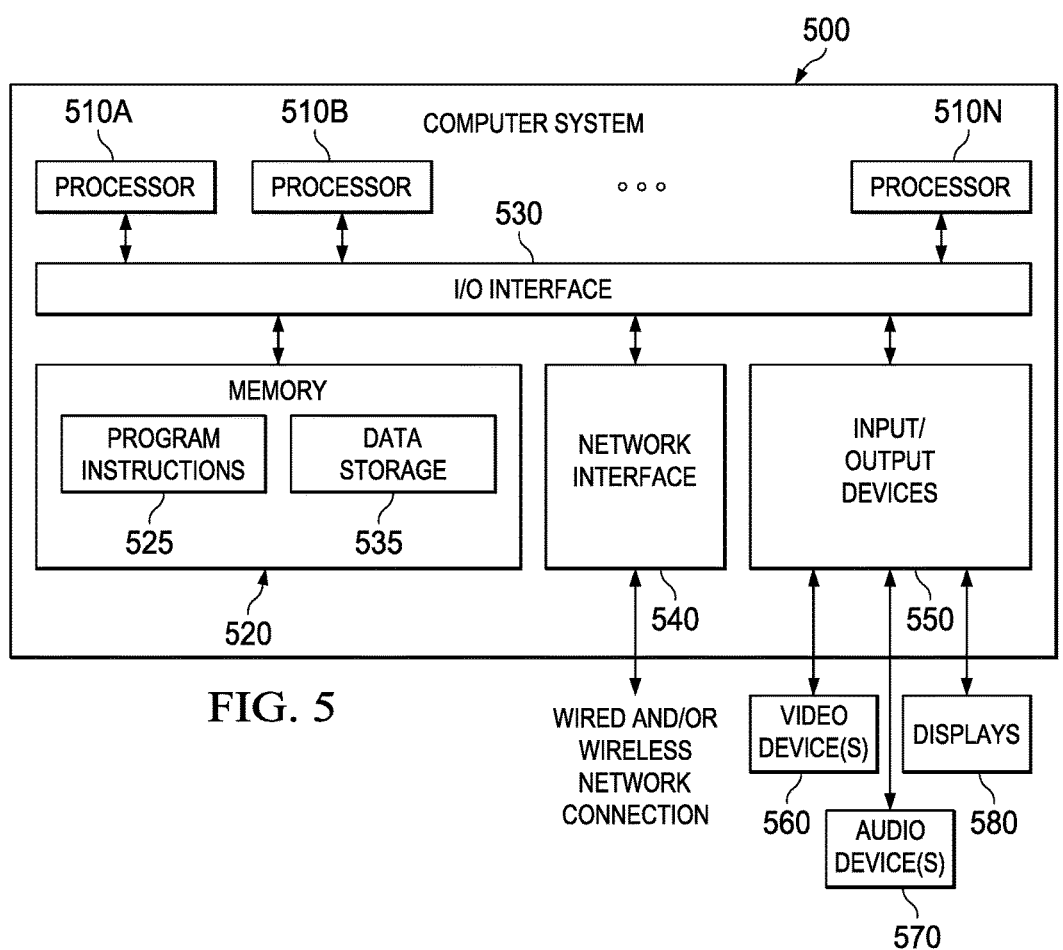

Having thus described the invention in general terms, reference will now be made to the accompanying drawings, which are not necessarily drawn to scale, and wherein:

FIG. 1 is a diagrammatic illustration of an example communications environment, wherein an example of embodiments of the present systems and methods for inbound calls to intelligent controlled-environment facility resident media and/or communications devices may be practiced, according to some embodiments;

FIG. 2 is a flowchart of an example process for inbound calling to intelligent controlled-environment facility resident media and/or communications devices, in accordance with some embodiments;

FIG. 3 is a flowchart of another implementation of an example process for inbound calling to intelligent controlled-environment facility resident media and/or communications devices, in accordance with some embodiments;

FIG. 4 is a flowchart of an example implementation of a process for inbound calling to intelligent controlled-environment facility resident media and/or communications devices employing authentication by the called controlled-environment facility resident media and/or communications device, in accordance with some embodiments; and FIG. 5 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to communications with residents of controlled-environment facilities, and specifically to inbound phone and video calls to intelligent controlled-environment facility resident media and/or communications devices. Embodiments of the present systems and methods for processing inbound calls to resident media and/or communications devices may employ an inbound resident call server configured to host inbound calling accounts established by non-residents, receive inbound calls from the non-residents, route the inbound calls to an authenticating server, confirm that the resident device is active, and connect the inbound resident call system with the resident device if active or inform the non-resident the resident is not available. The inbound resident call server also connects the non-resident inbound call with the resident device if the non-resident is associated with the inbound calling account, the inbound calling account is associated with an address identifier of the resident device and a personal identification number provided by the called resident is associated with the address identifier of the resident device, all of which may be authenticated by the authenticating server.

Controlled-environment facility calls have traditionally been outgoing only, such as prepaid calls, collect calls or calls made by residents paid for using a trust account maintained to the benefit of the resident. Inbound calls to residents have here-to-fore not been allowed or have been impractical. For example, inbound calls to a correctional facility wall-mounted, table top, roll around, or similar phone in inmate housing areas (i.e. the phones inmates have traditionally used to place outbound calls, such as via an interactive voice response system (IVR)) cannot be properly directed to the intended inmate, since the phone may be answered by any inmate, who may not cooperate, or may not be able to cooperate, to get the intended inmate on the phone. However, controlled-environment facility resident media and/or communications devices, such as tablet computing devices, or the like, specially adapted and/or otherwise approved for use in the controlled-environment facility are capable of receiving inbound communications, such as via a wireless network associated with the controlled-environment facility.

In accordance with embodiments of the present systems and methods, a non-resident can set-up inbound calling account, such as via a website, provide for payment, and place inbound calls to controlled-environment facility resident media and/or communications devices, such as resident tablets. Various embodiments of such systems and methods may accept an inbound call to an inbound controlled-environment facility resident media and/or communications device call server (or via a website). Where the inbound call is directed to a central number for calls directed to controlled-environment facility resident media and/or communications devices, the method may further comprise accepting a request from the non-resident for a call into the resident and/or the controlled-environment facility resident media and/or communications device. Various embodiments of the present systems and methods are directed to allowing inbound calls to residents based on a controlled-environment facility resident media and/or communications device Address Identifier (AID), residents name and, in some embodiments a resident-associated identification number. This AID number may be married to the call request in such embodiments and the resident may accept a forwarded call by entering personal identification number (PIN) and/or verifying authentication, such as through voice recognition, key pad, touchpad, fingerprint or other biometric, non-biometric, or other authentication methods. A PIN can be entered in any number of ways, which may incorporate biometric verification into the entering of the PIN itself. For example, the PIN may be entered using a touchscreen, such that fingerprint recognition can be used to verify the typer's identity. Alternatively (or additionally) the PIN may be spoken to be entered, and while speech recognition may be used to recognize the spoken numbers of the PIN, voice recognition may be used on the spoken PIN to verify the speaker's identity. Further, an image of the user may be captured during such PIN entry and facial recognition may be used to (further) confirm the identity of the user, such as for correlation with the PIN. Security measures applied to inbound calls may include similarly use of voice recognition (during the call) to ensure the tablet is not handed off to another resident (or monitoring to see who the tablet is handed off to). Voice mail, and other call features may also be employed in conjunction with various embodiments of the present systems and methods.

FIG. 1 is a diagrammatic illustration of an example communications environment, wherein example embodiments of the present systems and methods for inbound phone or video calls to intelligent controlled-environment facility resident media and/or communications devices may be practiced, according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device (104), referred to herein as a(n) (intelligent) controlled-environment facility resident media and/or communications device, an inmate media and/or communications device, or the like, to access such services. For example, an inmate may initiate telephone services by lifting the receiver on telephone 102 or launching a communications application program (app) on inmate media and/or communications device 104, at which time the inmate may be prompted to provide a PIN, other identifying information or biometrics. An interactive voice response (IVR) unit (not shown) may generate and play a prompt, send a text or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally, or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109 or device 112.

Video visitation devices 103 may have video conferencing capabilities to enable inmates to participate in video visitation sessions with non-residents of the correctional facility via video call, secure online chat, etc. For example, a non-resident party may have a personal or laptop computer 113 with camera 114 (or a cell phone, tablet computer, etc.). Additionally, or alternatively, device 112 may have an integrated camera and display (e.g., a smart phone, tablet, etc.). A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards. Generally speaking, each video visitation device 103 may be disposed in a visitation room, in a pod, cell, etc.

In some embodiments, video visitation devices 103 may be implemented as a computer-based system. For example, each of video visitation devices 103 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, video visitation devices 103 may be configured to capture a video image of an inmate to be transmitted to a non-resident using the camera, and to display a video image of the non-resident to the inmate using the display. Video visitation devices 103 may also be configured to capture an audio signal from the inmate to be transmitted to a non-resident using the mouthpiece portion of the handset, and to provide an audio signal from the non-resident to the inmate using the earpiece portion of the handset. Additionally, or alternatively, audio received from the non-resident may be reproduced via a loudspeaker, and audio provided by the inmate may be captured via a microphone. In some cases, video visitation devices 103 may assume the form of any computer, tablet computer, smart phone, etc., or any other consumer device or appliance with videoconferencing capabilities.

Intelligent controlled-environment facility resident media and/or communications devices 104 may be tablet computing devices, smartphones, media players, or the like adapted and/or approved for use by residents of the controlled-environment facility (within the controlled-environment facility). Each intelligent controlled-environment facility resident media and/or communications device 104 may be particularly adapted for use in a controlled-environment. For example, in a correctional institution, jail, or the like, such an intelligent controlled-environment facility resident media and/or communications device, may have a specially adapted operating system and/or may be "stripped-down," particularly from the standpoint of what apps and/or hardware are provided or allowed on intelligent controlled-environment facility resident media and/or communications device 104, and/or connectivity afforded such a device. For example, such a device may employ an operating system kernel such one based upon an open source platform such as the CyanogenMod-based operating system, which may be built for use in such a device in a controlled-environment facility. As a further example, the intelligent controlled-environment facility resident media and/or communications device may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the intelligent controlled-environment facility resident media and/or communications device may allow access to apps or content only upon application of security measures, by the device. Such security measures may include determining, by the device, DNS spoofing, DNS redirection, use of proxy servers for privacy and security, biometric validation, password validation, and/or the like. Also, in accordance with embodiments of the present systems and methods, the intelligent controlled-environment facility resident media and/or communications device may have a few fixed apps preinstalled on the device, and installation of further apps on the device may be forbidden (i.e. prevented by modifications to the device's operating system, or the like) and/or restricted, such as by requiring permission from a facility administrator, or the like. Apps provided on intelligent controlled-environment facility resident media and/or communications devices might include apps of particular interest to residents of the controlled-environment facility. For example, such inmate media and/or communications devices provided to inmates of correctional facilities, might include apps that may be of particular use to an inmate, in general, such as access to a legal research service, or of more specific interest, such as providing an inmate nearing release, access to employment searching apps or the like. Hence, such inmate media and/or communications devices may be used to help soon-to-be released inmates to transition. For example, the inmate media and/or communications device may be used to communicate with a future employer, or the like. As such, inmate media and/or communications devices may be sponsored, or otherwise subsidized by organizations or companies, assisting with the transition of inmates into society.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Personal Allowed Number (PAN) or Pre-Approved Contact (PAC) list. Each inmate's PAN or PAC list may be stored, for example, in database 115 maintained by Administration and Management System (AMS) 116. In addition to PAN or PAC list(s), AMS 116 may also store inmate or resident profile data (RPD), as well as visitation rules applicable to each inmate.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; video and/or audio communication recordings; known or suspected gang or criminal affiliations; known or suspected affiliates, accomplices, or gang members; and any other information that may be relevant or useful to correctional facility staff to house and maintain inmates.

In some implementations, communication system 101 may be configured to perform call and/or video visitation monitoring operations configured to monitor and or record calls and/or video visitations (e.g., as electronic audio or video files). Such monitoring may be carried out to detect impermissible activity, such as attempts to initiate three-way calls, and/or for investigative purposes, such as detection of keywords related to criminal activity or the like. In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In many controlled-environment facilities, inmates are restricted from communicating with persons outside of the controlled-environment facility using any device other than the system described in FIG. 1. Reasons for this include protection of persons outside of the controlled-environment facility from offensive, inappropriate, or illegal contact with an inmate. Additionally, these restrictions may help to prevent inmates from directing further illegal activity with conspirators located outside of the controlled-environment facility, witness tampering, victim protection etc. Administrators of the controlled-environment facility may wish to limit the inmate's contact to parties on the inmate's PAN or PAC list.

In the illustrated environment, inbound phone or video call processing system 130 may process inbound calls to intelligent controlled-environment facility resident media and/or communications devices 104. Inbound call processing system 130, may include inbound resident call server 132, which may include at least one processor and memory coupled to the processor(s), wherein the memory is configured to store program instructions executable by the processor(s) to cause the system(s) to execute one or more operations. For example, inbound call processing server 132 may be configured to host inbound calling accounts 134 established by non-residents of a controlled-environment facility. Inbound call processing server 132 may also be configured to receive inbound calls from the non-residents, such as calls from non-resident devices 105, 106, 109, 112 or 113, and to route such inbound calls to authenticating server 136, which may, as mentioned above be integrated into inbound call processing server 132 in whole or part, or separate therefrom. Likewise, inbound call processing server 132, and hence authenticating server 136 may, in some embodiments be integrated into controlled-environment facility communications processing system 101, thereby integrating inbound calling system 130 into controlled-environment facility communications processing system 101.

The inbound call from the non-resident may be intended by the non-resident to be directed to the controlled-environment facility resident media and/or communications device (104) of the resident the non-resident wishes to call. In such cases, inbound call processing server 132 may intercept the inbound call. Additionally, or alternatively, inbound resident call server 132 may host a central phone number, such as a toll-free number, for calls directed to controlled-environment facility resident media and/or communications devices 104. In such embodiments, an inbound call from a non-resident device (105, 106, 109, 112 or 113) may be directed to the central phone number and inbound resident call server 132 may correspondingly be configured to accept requests from non-residents for calls into residents via their controlled-environment facility resident media and/or communications device (104).

Inbound call processing server 132 may also be configured to confirm that the controlled-environment facility resident media and/or communications device (104) being called is active (i.e. available and reachable to receive the inbound call, etc.) or inactive (i.e. the called controlled-environment facility resident media and/or communications device is not active or not available, busy, etc.). If the called controlled-environment facility resident media and/or communications device is active, inbound call processing server 132 may connect with the controlled-environment facility resident media and/or communications device (104), but if the controlled-environment facility resident media and/or communications device is not active inbound call processing server 132 may inform the non-resident that the resident is not available for the inbound call.

Inbound call processing system 130, may as also indicated, include authenticating server 136, which may also make use of at least one processor and memory coupled to the processor(s), wherein the memory is configured to store program instructions executable by the processor(s) to cause the server(s) to execute one or more operations. For example, authenticating server 136 may be configured to authenticate that a non-resident is associated with an inbound calling account (134) and confirm that the inbound calling account is associated with an Address Identifier (AID) number of the controlled-environment facility resident media and/or communications device (104) the non-resident has indicated (i.e. the device the non-resident has called or the device of the resident the non-resident has requested). This unique AID may be tied to a resident name and number and a Media Access Control (MAC) address of the subject controlled-environment facility resident media and/or communications device (104). The MAC address and AID are Hardcoded Addresses (HCAs), which may also include a processor number, or the like for uniquely identifying the subject controlled-environment facility resident media and/or communications device (104). Further, authenticating server 136 may receive, via the controlled-environment facility resident media and/or communications device, such as a PIN entered by the resident on the device, biometric data, Radio-Frequency Identification (RFID) (e.g. from a device worn by the resident, such as a bracelet, clothing, etc.) and/or other identification verification data, any of which should be associated with the resident to whom the inbound call is directed. The PIN can be entered in any number of ways via device 104. For example, the PIN may be spoken and entered using speech recognition and/or it may be entered using a touch screen keypad, or the like. Further, entry of the PIN may incorporate biometric verification into the entering of the PIN itself. For example, if the PIN is entered using the device's touchscreen, fingerprint recognition can be used to verify the typer's identity. Alternatively, or additionally, if the PIN is spoken for entry, voice recognition may be used to verify the speaker's identity, while speech recognition may be used to recognize the spoken numbers of the PIN themselves. Further, a camera of controlled-environment facility resident media and/or communications device 104 may be used during spoken or typed PIN entry to capture an image of the party entering the PIN, and the image may be used for facial recognition of the device user to (further) confirm the identity of the user, which may be used for (further) correlation with the PIN. Regardless, authenticating server 136 may verify that the PIN (and verified user) is associated with the AID number of the controlled-environment facility resident media and/or communications device.

Inbound call processing server 132 may connect the non-resident inbound call with the target controlled-environment facility resident media and/or communications device (104). In one example, proceeding with such a connection may result from, as discussed above, server 136 authenticating that the non-resident is associated with the inbound calling account (134), confirming that the inbound calling account is associated with an AID number of the controlled-environment facility resident media and/or communications device (104) and/or verifying that the PIN is associated with the AID number of the controlled-environment facility resident media and/or communications device (104).

In alternative embodiments, authentication may be carried out by called controlled-environment facility resident media and/or communications device 104. In such embodiments, inbound resident call server 132 may be configured to receive inbound calls from the non-residents, such as calls from non-resident devices 105, 106, 109, 112 or 113, and to route such inbound calls directly to resident media and/or communications device 104.

The inbound call from the non-resident may be intended by the non-resident to be directed to the controlled-environment facility resident media and/or communications device (104) of the resident the non-resident wishes to call. In such cases, inbound call processing server 132 may, or may not intercept the inbound call. In these embodiments, authentication may be carried out by the called controlled-environment facility resident media and/or communications device. In some such embodiments, inbound resident call server 132 may still, additionally or alternatively host a central phone number, such as a toll-free number, for calls directed to controlled-environment facility resident media and/or communications devices 104. In such further embodiments, an inbound call from a non-resident device (105, 106, 109, 112 or 113) may be directed to the central phone number and inbound resident call server 132 may correspondingly be configured to accept requests from non-residents for calls into residents via their controlled-environment facility resident media and/or communications device (104).

As above, inbound call processing server 132 may also be configured to confirm that the controlled-environment facility resident media and/or communications device (104) being called is active (i.e. available and reachable to receive the inbound call, etc.) or inactive (i.e. the called controlled-environment facility resident media and/or communications device is not active or not available, busy, etc.). If the called controlled-environment facility resident media and/or communications device is active, inbound call processing server 132 may connect with the controlled-environment facility resident media and/or communications device (104) to initiate authentication of the call by the called resident media and/or communications device. However, if the called controlled-environment facility resident media and/or communications device is not active, inbound call processing server 132 may inform the non-resident that the resident is not available for the inbound call.

In embodiments where authentication is carried out by the called controlled-environment facility resident media and/or communications device (104), resident media and/or communications device 104 may each be configured to authenticate that the calling non-resident is associated with an AID of the device, when the device is called. To this end the called device (104) may be configured to authenticate that a non-resident is associated with an inbound calling account (134) and/or confirm that the inbound calling account is associated with an AID number of the controlled-environment facility resident media and/or communications device (104) the non-resident has indicated (i.e. the device the non-resident has called or the device of the resident the non-resident has requested).

Further, in such embodiments, called resident media and/or communications device 104 may directly receive a PIN entered by the resident and which should be associated with the resident the inbound call is directed to. The PIN can be entered in any number of ways via device 104. For example, the PIN may be spoken and accepted for entry using speech recognition and/or it may be entered using a touch screen keypad, or the like. Further, entry of the PIN may incorporate biometric verification into the entering of the PIN itself. For example, if the PIN is entered using the device's touchscreen, fingerprint recognition can be used by the resident media and/or communications device to verify the typer's identity. Alternatively, or additionally, if the PIN is spoken for entry, voice recognition may be used by the resident media and/or communications device to verify the speaker's identity, while speech recognition may be used by the resident media and/or communications device to recognize the spoken numbers of the PIN itself. Further, a camera of the controlled-environment facility resident media and/or communications device may be used during spoken or typed PIN entry to capture an image of the party entering the PIN, and the image may be used by the resident media and/or communications device for facial recognition, other image recognition, such as ocular-based recognition, or the like, of the device user to (further) confirm the identity of the user, which may be used for (further) correlation with the PIN. Regardless, the resident media and/or communications device may verify that the PIN (and verified user) is associated with the AID number of the controlled-environment facility resident media and/or communications device.

Resident media and/or communications device 104 and/or inbound call processing server 132 may connect the non-resident inbound call with the target controlled-environment facility resident media and/or communications device (104). For example, the inbound call may be connected as a result of resident media and/or communications device 104 authenticating that the calling non-resident is associated with an AID of the called controlled-environment facility resident media and/or communications device (104) and verifying that resident verification data, such as a PIN entered on the device, is associated with the AID number of the called controlled-environment facility resident media and/or communications device (104). Such verification may result from resident media and/or communications device 104 verifying authentication of the resident operating the resident device using the entered and/or captured data (PIN, biometric data, etc.) and verifying that the resident so authenticated is associated with the AID of the resident device.

FIG. 2 is a flowchart of example process 200 for inbound phone or video calling to intelligent controlled-environment facility resident (e.g. inmate) media and/or communications devices, in accordance with some embodiments. Therein, a method for processing inbound calls to intelligent controlled-environment facility resident media and/or communications devices is illustrated. At 202 an inbound calling account (134) in accordance with a controlled-environment facility communications system/network arrangement is established for a non-resident (e.g. non-inmate friend, family member, etc.) of the controlled-environment facility (e.g. correctional facility). At 204 an inbound call from the non-resident is received into an inbound resident call system (130). This inbound call from the non-resident may be initially be directed directly to the resident, i.e. to the controlled-environment facility resident media and/or communications device (104), and may be (intercepted and) redirected to initially be received in the inbound resident call system (130) for processing in accordance herewith. However, the inbound call from the non-resident may be directed to a central phone number, such as a toll-free number or the like, for calls directed to controlled-environment facility resident media and/or communications devices (104). In such a case, various method implementations may call for acceptance of a request at 206 from the non-resident for a call into the resident and/or resident's controlled-environment facility resident media and/or communications device (104).

At 208 the inbound call may be routed to an authenticating server (136). This authenticating server may, as noted above, be separate from, or integrated into or with an inbound resident call server (132), which in turn, may a or may not be a part of the controlled-environment facility communications processing system (101). At 210 the non-resident is authenticated, such as by the authenticating server (136), as associated with the inbound calling account (134) being accessed. The authenticating server (136), or the like, may then confirm at 212 that the inbound calling account is associated with an AID number of the controlled-environment facility resident media and/or communications device (104) being called. Various implementations of the present systems and methods may also confirm that the called resident (e.g. the resident associated with the controlled-environment facility resident media and/or communications device to which the inbound call is directed) is allowed to communicate with the calling non-resident at 214, such as by determining if the non-resident is on a PAN and/or PAC list associated with the resident.

The inbound resident call system (130) may confirm that the controlled-environment facility resident media and/or communications device (104) is active, at 216. If the controlled-environment facility resident media and/or communications device (104) is found to be active at 216, the inbound resident call system may connect with the controlled-environment facility resident media and/or communications device at 218. However, in response to a failure at 216 to confirm that the controlled-environment facility resident media and/or communications device (104) is active (i.e. the called controlled-environment facility resident media and/or communications device is not active or not available, busy, etc.) the inbound resident call system (130), or the like, may inform the non-resident, at 220, that the resident is not available for the inbound call. At 222 the authenticating server (136), or the like receives a PIN associated with a resident the inbound call is directed to. This personal identification number may be sent via the controlled-environment facility resident media and/or communications device (104) being called by the non-resident. This PIN may be verified at 224, such as by the authenticating server, as being associated with the AID number of the controlled-environment facility resident media and/or communications device (104) being called (and providing the PIN). As noted this PIN may be entered in any number of ways. Additionally, such entry may, incorporate biometric, or other verification, such as RFID, or the like, into this entering of the PIN. For example, the PIN may be entered using a touchscreen of the controlled-environment facility resident media and/or communications device (104), such that fingerprint recognition can be used to verify the device user's identity, which may be matched to the PIN. Alternatively, or additionally, the PIN may be spoken into a microphone of controlled-environment facility resident media and/or communications device (104) to be entered. In such entry, speech recognition may be used to recognize the spoken numbers of the PIN, while voice recognition may be used on the spoken PIN to verify the speaker's identity, which may be matched to the PIN digits. Moreover, the camera of the controlled-environment facility resident media and/or communications device may be used, such as while the PIN is typed or spoken to capture an image of the speaker/user for use in facial recognition of the device user to (further) confirm the identity of the user for correlation with the PIN.

At 226 the non-resident inbound call may be connected with the controlled-environment facility resident media and/or communications device (104), by the inbound resident call system (130), such as, as a result of authenticating that the non-resident is associated with the inbound calling account (134) at 210, confirming that the inbound calling account is associated with an AID number of the controlled-environment facility resident media and/or communications device at 212, confirming that the calling non-resident is allowed to communicate with the resident at 214 and/or verifying that the personal identification number is associated with the AID number of the controlled-environment facility resident media and/or communications device at 224.

In accordance with various implementations of the present systems and methods a flat fee, subscription fee, time-based fee or the like may be charged for the inbound call and decremented at 228 from the inbound calling account (134) established at 202 and associated with the non-resident. For example, a flat fee, per-minute fee, or the like, may be charged for the inbound call. Additionally, or alternatively, (a) subscription fees may be periodically (e.g. monthly) charged for inbound calls by the non-resident to one or more residents, beginning, such as, when the non-resident's inbound calling account is established at 202. Such fees may be decremented from an account associated with the non-resident, which may also be established at such time. Further, the connected call may be monitored and/or recorded, such as for investigative purposes at 230. For example, such monitoring may be carried out for detection of impermissible activity such as attempts to initiate three-way calls, and/or monitored for keywords of the like, such as for investigative purposes. Call recordings may be stored for later review for similar investigative purposes. Additionally, or alternatively the connected call may be tracked, such as through creation of a communication detail record (CDR) during and/or after the call at 232.

FIG. 3 is a flowchart of another implementation of an example process (300) for inbound phone or video calling to intelligent controlled-environment facility resident media and/or communications devices, in accordance with some embodiments. Therein, a non-resident (e.g. non-inmate), such as a friend or family member of a controlled-environment facility resident (e.g. inmate), may, at 302 access a website, such as may be hosted by the controlled-environment facility and/or an associated entity such as a communications provider for the controlled-environment facility, or the like. At 304 a determination may be made as to whether the non-resident is registered to make inbound calls. If not, the non-resident may register at 306 to make inbound calls, such as by selecting a facility, a resident and choosing a call plan, establishing and funding an inbound calling account (134), and/or the like. The non-resident may then enter personal and/or identification information at 308. At 310 the non-resident may select the facility and resident that they wish to call and at 312 the non-resident may click a webpage button to initiate the call.

Alternatively, or in situations where the non-resident has already established an inbound calling account (134), the non-resident may call a central number, such as a toll-free number, at 314. The present inbound calling system (130) may answer the call at 316 and at 318 IVR functionality associated with the inbound call processing system (130) may prompt the non-resident for their identification information. At 320 the IVR may prompt the non-resident for information about the resident being called, such as identification information, to initiate the call.

Whether the inbound call is initiated via the website (steps 302 through 312) or through a call placed into the system (steps 314 through 320) the inbound calling system verifies that the rules allow calls to the selected resident at 322, such as in the manner discussed above with respect to PAN and PAC lists. At 324 a determination is made as to whether the resident's communication device is online (i.e. whether the resident is on his or her resident communication media device (104)). If it is determined at 324 that the resident is using his or her resident communication media device (104), the inbound calling system (130) directs the call to the resident's communication media tablet device (104) at 326. Thereupon, a phone application program (app) rings on the resident's tablet (104) at 328. At 330 the resident answers the call, and at 332 the inbound call system (130) verifies the resident's identity by requiring a PIN, and/or verifying authentication, such as through RFID, voice recognition, key pad, touchpad, fingerprint or other biometric, non-biometric, or other authentication methods. For example, the PIN may be entered by speaking it into the microphone of the controlled-environment facility resident media and/or communications device (104), by entering it on a keypad displayed on the touch screen of the device, and/or the like. This PIN entry process itself may incorporate biometric verification. For example, when the PIN is entered using the touchscreen, fingerprint recognition can be used to verify the user's identity. Alternatively, or additionally, a spoken PIN may not only be subjected to speech recognition to recognize the spoken numbers of the PIN, but also to voice recognition to verify the speaker's identity. Further, the camera of controlled-environment facility resident media and/or communications device (104) may be used during spoken or typed PIN entry as part of facial recognition of the device user to (further) confirm the identity of the user for correlation with the PIN.

A determination is made at 334, such as by the inbound calling system (130), as to whether recording is enabled for the call, such as may be required for security reasons, investigative purposes, and/or the like, particularly with respect to the identity of the resident and/or the non-resident. If it is determined at 334 that the call is to be recorded, the inbound calling system (130) starts recording the call at 336. Additionally, or alternative, the call may be monitored, such as at 336 for impermissible activity such as attempts at three-way calling, or the like, and/or for keywords, or the like for investigative purposes. Similarly, the recording may be stored for later review for such investigative purposes. Regardless, at 338 the inbound calling system (130) joins the resident and non-resident for the call to take place. Once the call terminates at 340 a CDR may be generated at 342 for accounting, security, investigative, and/or other purposes, and any recording of the call may be linked thereto.

FIG. 4 is a flowchart of an example implementation 400 of a process for inbound calling to intelligent controlled-environment facility resident media and/or communications devices (104) employing authentication by the called resident device (104), in accordance with some embodiments. Therein, process 400 for inbound calling to controlled-environment facility resident media and/or communications devices may call upon an inbound controlled-environment facility resident call server (132) to route received inbound calls from non-residents to resident devices to which the inbound calls are directed, at 402. In alternative embodiments of the present systems and methods where authentication is implemented in the resident media and/or communications devices (104), the inbound call may be placed directly to the resident media and/or communications device for receipt at 402. Regardless, the received or routed call may be blocked (e.g. may not be connected) until the following steps are performed.

Regardless, at 404, the called controlled-environment facility resident media and/or communications device (104) confirms that the non-resident calling is associated with an AID of the called resident device. Further, at 406, the called resident device, receives data for verifying authentication of a controlled-environment facility resident operating the resident device. This data for verifying authentication of a resident may include a PIN entered by the resident on the device, biometric data captured by the device, RFID captured by the device, and/or the like. Regardless, the called resident device, verifies the authentication (e.g. identification) of the controlled-environment facility resident operating the resident device, at 408, using the received data. This verification may verify that the resident operating the called resident device is the resident to whom the call is directed and/or that the resident is authorized to operate the called resident device.

As above, in implementations where the called controlled-environment facility resident media and/or communications device (104) carried out authentication, the resident device (104) may directly receive, at 406, a PIN entered by the resident as at least part of the above-mentioned data for verifying authentication of the resident operating the device. Again, the PIN can be entered in any number of ways into the called resident device. For example, the PIN may be spoken and accepted for entry using speech recognition and/or it may be entered using a touch screen keypad, or the like. Further, entry of the PIN may provide an opportunity to incorporate biometric verification into the entering of the PIN itself, to further facilitate verification at 408. For example, if the PIN is entered using the called resident device's touchscreen at 406, or otherwise, fingerprint recognition can be used by the called resident device at 408 to verify the typer's identity. The capture of the fingerprint(s) of the resident operating the called resident device may be carried out at the time of the entry of the PIN, or otherwise in the course of use of the called resident device, such as in a random manner, or the like. Such capture of fingerprints during the course of the use of the device may be used to verify authentication of the resident during other use of the device, such as by way of example, just prior to a call, during a connected call, or the like. Alternatively, or additionally, if the PIN is spoken to be entered at 406, speech recognition may be used by the called resident device to accept PIN entry at 406 by the resident device recognizing the spoken digits of the PIN, whereas additionally or alternatively voice recognition may be used by the called resident device to verify the speaker's identity at 408. A camera of the called resident device may be used during spoken or typed PIN entry at 408 to capture an image of the party entering the PIN, and the image may be used by the resident device, at 408, for facial recognition, other image recognition, such as ocular-based recognition, or the like, of the device user to (further) confirm the identity of the user, which may be used for (further) correlation with the PIN.

Regardless, at 410, the called controlled-environment facility resident media and/or communications device (104) further verifies that the resident identified (i.e. verified) as operating the called resident device is associated with the AID of the called resident device. For example, the called resident device may verify that the PIN (and hence the verified user) is associated with the AID number of the called resident device.

At 412 the inbound call is connected with the controlled-environment facility resident media and/or communications device (104) as a result of the resident device authenticating that the non-resident is associated with the AID of the called resident device at 404, verifying authentication of the controlled-environment facility resident operating the called resident device, and verifying that the resident operating the called resident device is associated with the AID of the called resident device. This connection at 412 may be carried out by the called resident device itself, such as where the called resident device is blocked from receiving the call prior to carrying out the authentication described above at 404 through 410. Alternatively, the inbound controlled-environment facility resident call server (132) may carry out the connecting of the inbound call at 412. Regardless, receiving data at 404 for verifying authentication of a resident operating the resident device, verifying authentication identification of the resident operating the called resident device at 408 and verifying at 410 that the resultantly verified controlled-environment facility resident operating the called resident device is associated with the AID of the called resident device, are all carried out by the called resident device in response to the inbound call being routed to the called resident device at 402 or the call being received directly into the called device, prior to connection at 412.

In accordance with some embodiments of the present systems and methods, multilayer authentication of a resident operating a called controlled-environment facility resident media and/or communications device (104) may be employed. Therein, the called resident device has, prior to the inbound call being routed to the called resident device (402), for one reason or another, previously received the data for verifying authentication of the controlled-environment facility resident operating the called resident device, verified authentication of the resident operating the called resident device and/or verified that the resultantly verified resident operating the called resident device is associated with the AID of the called resident device. In accordance with multilayer authentication implementations, prior to connecting the inbound call (at 412), the called resident device may employ another layer of authentication, such as in response to the inbound call being routed to the called resident device (at 402) or in response to the resident device otherwise receiving an inbound call. Such another layer of authentication may call for the called resident device receiving the same or different data for re-verifying authentication of the resident operating the called resident device (in a manner similar to 406), re-verifying (in a manner similar to 408) authentication of the resident operating the called resident device using the data, and/or (in a manner similar to 410) re-verifying that the resultantly verified resident operating the called resident device is associated with the AID of the called resident device.

Embodiments of the present systems and methods for inbound calls to intelligent controlled-environment facility resident media and/or communications devices (104), as described herein, may be implemented or executed, at least in part, by one or more computer systems. One such computer system is illustrated in FIG. 5. In various embodiments, computer system 500 may be a server, a mainframe computer system, a workstation, a network computer, a desktop computer, a laptop, a tablet computing device, media player, or the like. For example, in some cases, computer 500 may implement one or more steps of example processes 200, 300 and/or 400 described above with respect to FIGS. 1 through 4, and/or a computer system such as computer system 500 may be used as, or as part of, one or more of controlled environment facility communication processing system 101, intelligent controlled-environment facility resident media and/or communications device 104, inbound call processing system 130, inbound resident call server 132, authenticating server 136, and/or the like. In various embodiments two or more of these computer systems may be configured to communicate with each other in any suitable way, such as, for example, via a network, including via a local area network, and/or using wireless functionality.

As illustrated, example computer system 500 includes one or more processors 510 coupled to a system memory 520 via an input/output (I/O) interface 530. Example computer system 500 further includes a network interface 540 coupled to I/O interface 530, and one or more input/output devices 550, such as video device(s) 560 (e.g., a camera), audio device(s) 570 (e.g., a microphone and/or a speaker), and display(s) 580. Computer system 500 may also include a cursor control device (e.g., a mouse or touchpad), a keyboard, etc. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In various embodiments, computer system 500 may be a single-processor system including one processor 510, or a multi-processor system including two or more processors 510 (e.g., two, four, eight, or another suitable number). Processors 510 may be any processor capable of executing program instructions. For example, in various embodiments, processors 510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 510 may commonly, but not necessarily, implement the same ISA. Also, in some embodiments, at least one processor 510 may be a graphics processing unit (GPU) or other dedicated graphics-rendering device.

System memory 520 may be configured to store program instructions and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 520 as program instructions 525 and data storage 535, respectively. In other embodiments, program instructions and/or data may be received, sent or stored upon different types of computer-accessible media or on similar media separate from system memory 520 or computer system 500. Generally speaking, a computer-readable medium may include any tangible or non-transitory storage media or memory media such as magnetic or optical media—e.g., disk or CD/DVD-ROM coupled to computer system 500 via I/O interface 530, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 540.

In some embodiments, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any suitable protocol, timing or other data transformations to convert data signals from one component (e.g., system memory 520) into a format usable by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments, some or all of the functionality of I/O interface 530, such as an interface to system memory 520, may be incorporated into processor 510.

Network interface 540 may be configured to allow data to be exchanged between computer system 500 and other devices attached to a network, such as other computer systems, or between nodes of computer system 500. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 5, memory 520 may include program instructions 525, configured to implement certain embodiments described herein, and data storage 535, comprising various data accessible by program instructions 525. In an embodiment, program instructions 525 may include software elements corresponding to one or more of the various embodiments illustrated in the above figures. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments. In other embodiments, other or different software elements and data may be included.

A person of ordinary skill in the art will appreciate that computer system 500 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An inbound call system for handling inbound calls to inmate media and/or communications devices, the system comprising:

an inbound inmate call server configured to route a non-inmate inbound call to an inmate media and/or communications device; and the inmate media and/or communications device configured to:
confirm that the non-inmate is associated with an address identifier of the inmate media and/or communications device the non-inmate is calling;
receive, via the inmate media and/or communications device, data for verifying authentication of an inmate operating the inmate media and/or communications device;
verify authentication of the inmate operating the inmate media and/or communications device using the data; and
verify that the inmate operating the inmate media and/or communications device is associated with the address identifier of the inmate media and/or communications device.

2. The system of claim 1, wherein the inbound inmate call server is further configured to connect the non-inmate inbound call to the inmate media and/or communications device in response to the inmate media and/or communications device authenticating that the non-inmate is associated with the address identifier of the inmate media and/or communications device, verifying authentication of the inmate operating the inmate media and/or communications device using the data, and verifying that the inmate operating the inmate media and/or communications device is associated with the address identifier of the inmate media and/or communications device.

3. The system of claim 1 wherein the inmate media and/or communications device is further configured to accept connection of the inbound call, by the inmate media and/or communications device, as a result of the inmate media and/or communications device authenticating that the non-inmate is associated with the address identifier of the inmate media and/or communications device, verifying authentication of the inmate operating the inmate media and/or communications device using the data, and verifying that the inmate operating the inmate media and/or communications device is associated with the address identifier of the inmate media and/or communications device.

4. The system of claim 1, wherein the data for verifying authentication of the inmate comprises biometric data and the inmate media and/or communications device is configured to capture the biometric data.

5. The system of claim 4, wherein the biometric data is the voice of the inmate operating the inmate media and/or communications device and the inmate media and/or communications device is further configured to verify authentication of the inmate operating the inmate media and/or communications device using voice recognition.

6. The system of claim 4, wherein the data for verifying authentication of the inmate further comprises a personal identification number entered into the inmate media and/or communications device by being spoken by the inmate operating the inmate media and/or communications device and the inmate media and/or communications device is further configured to accept the personal identification number using speech recognition.

7. The system of claim 4, wherein the biometric data is at least one fingerprint of the inmate operating the inmate media and/or communications device, and the inmate media and/or communications device is further configured to:
capture data related to at least one fingerprint of the inmate operating the inmate media and/or communications device during use of the inmate media and/or communications device; and
verify authentication of the inmate operating the inmate media and/or communications device using fingerprint recognition and the data related to at least one fingerprint.

8. The system of claim 4, wherein the biometric data is an image of the inmate using the inmate media and/or communications device, the inmate media and/or communications device further comprises a camera, and the inmate media and/or communications device is further configured to:
capture image data of the inmate operating the inmate media and/or communications device; and
verify authentication of the inmate operating the inmate media and/or communications device using facial recognition and the image data.

9. The system of claim 1, wherein the data for verifying authentication of the inmate comprises a personal identification number entered via the inmate media and/or communications device and the inmate media and/or communications device is further configured to verify the personal identification number is associated with an inmate to whom the inbound call is directed.

10. The system of claim 9, wherein the personal identification number is entered into the inmate media and/or communications device by being spoken by the inmate operating the inmate media and/or communications device and the inmate media and/or communications device is further configured to:
accept the personal identification number using speech recognition; and
verify authentication of the inmate operating the inmate media and/or communications device using voice recognition.

11. The system of claim 9, wherein the personal identification number is entered into the inmate media and/or communications device via a touchscreen keypad displayed by the inmate media and/or communications device, and the inmate media and/or communications device is further configured to:
capture data related to at least one fingerprint during entry; and
verify authentication of the inmate operating the inmate media and/or communications device using fingerprint recognition and the data related to at least one fingerprint.

12. The system of claim 9, wherein the inmate media and/or communications device further comprises a camera and is further configured to:
capture image data of the inmate operating the inmate media and/or communications device during entry of the personnel identification number into the inmate media and/or communications device; and
verify authentication of the inmate operating the inmate media and/or communications device using facial recognition and the image data.

13. The system of claim 1, wherein the inmate media and/or communications device is further configured to receive the data for verifying authentication of the inmate operating the inmate media and/or communications device, verify authentication of the inmate operating the inmate media and/or communications device and verify that the inmate operating the inmate media and/or communications device is associated with the address identifier of the inmate media and/or communications device, in response to the inbound call being routed to the inmate media and/or communications device.

14. The system of claim 1, wherein the inmate media and/or communications device has received the data for verifying authentication of the inmate operating the inmate media and/or communications device, verified authentication of the inmate operating the inmate media and/or communications device and/or verified that the inmate operating the inmate media and/or communications device, prior to the inbound call being routed to the inmate media and/or communications device, and the inmate media and/or communications device is further configured, in response to the inbound call being routed to the inmate media and/or communications device, to:
  receive the same or different data for re-verifying authentication of the inmate operating the inmate media and/or communications device;
  re-verify authentication of the inmate operating the inmate media and/or communications device using the data; and/or
  re-verify that the inmate operating the inmate media and/or communications device is associated with the address identifier of the inmate media and/or communications device.

15. A method for processing inbound calls to inmate media and/or communications devices, the method comprising:
  routing, by an inbound inmate call server, an inbound call from a non-inmate to an inmate media and/or communications device to which the inbound call is directed;
  confirming, by the inmate media and/or communications device, that the non-inmate is associated with an address identifier of the inmate media and/or communications device;
  receiving, by the inmate media and/or communications device, data for verifying authentication of an inmate operating the inmate media and/or communications device;
  verifying, by the inmate media and/or communications device, authentication identification of the inmate operating the inmate media and/or communications device using the data;
  verifying, by the inmate media and/or communications device, that the resultantly verified inmate operating the inmate media and/or communications device is associated with the address identifier of the inmate media and/or communications device; and
  connecting the inbound call with the inmate media and/or communications device, as a result of the inmate media and/or communications device:
    authenticating that the non-inmate is associated with the address identifier of the inmate media and/or communications device;
    verifying authentication of the inmate operating the inmate media and/or communications device using the data; and
    verifying that the inmate operating the inmate media and/or communications device is associated with the address identifier of the inmate media and/or communications device.

16. The method of claim 15, wherein the inmate media and/or communications device carries out the connecting of the inbound call routed to the inmate media and/or communications device.

17. The method of claim 15, wherein the inbound inmate call server carries out the connecting of the inbound call.

18. The method of claim 15, wherein the data for verifying authentication of the inmate comprises a personal identification number, and the method further comprises accepting entry of the personal identification number by the inmate media and/or communications device and verifying, by the inmate media and/or communications device that the personal identification number is associated with an inmate to whom the inbound call is directed.

19. The method of claim 18, further comprising:
  accepting entry of a spoken personal identification number, by the inmate media and/or communications device;
  accepting the personal identification number, by the inmate media and/or communications device, using speech recognition; and
  verifying, by the inmate media and/or communications device, authentication of the inmate operating the inmate media and/or communications device using voice recognition.

20. The method of claim 18, further comprising:
  accepting entry of the personal identification number, by the inmate media and/or communications device, via a touchscreen keypad displayed by the inmate media and/or communications device;
  capturing, by the inmate media and/or communications device, during the entry, data related to at least one fingerprint; and
  verifying, by the inmate media and/or communications device, authentication of the inmate operating the inmate media and/or communications device using fingerprint recognition and the data related to at least one fingerprint.

21. The method of claim 18, further comprising:
  capturing, by a camera of the inmate media and/or communications device, image data of the inmate operating the inmate media and/or communications device during entry of the personnel identification number into the inmate media and/or communications device; and
  verifying, by the inmate media and/or communications device, authentication of the inmate operating the inmate media and/or communications device using facial recognition and the image data.

22. The method of claim 15, wherein the data for verifying authentication of the inmate comprises biometric data, and the method further comprises capturing the biometric data by the inmate media and/or communications device.

23. The method of claim 22, wherein the biometric data is the voice of the inmate operating the inmate media and/or communications device, and the method further comprises verifying, by the inmate media and/or communications device, authentication of the inmate operating the inmate media and/or communications device using voice recognition.

24. The method of claim 15, wherein receiving data for verifying authentication of an inmate operating the inmate media and/or communications device, verifying authentication identification of the inmate operating the inmate media and/or communications device using the data and verifying that the resultantly verified inmate operating the inmate media and/or communications device is associated with the address identifier of the inmate media and/or communications device, is carried out by the inmate media and/or communications device, in response to the inbound call being routed to the inmate media and/or communications device.

25. The method of claim 15, wherein the inmate media and/or communications device has received the data for verifying authentication of the inmate operating the inmate media and/or communications device, verified authentication of the inmate operating the inmate media and/or communications device and/or verified that the resultantly verified inmate operating the inmate media and/or communications device is associated with the address identifier of the inmate media and/or communications device, prior to the inbound call being routed to the inmate media and/or communications device, and the method further comprises, in response to the inbound call being routed to the inmate media and/or communications device, connecting the inbound call, by the inmate media and/or communications device, is as a result of:
- receiving, by the inmate media and/or communications device, the same or different data for re-verifying authentication of the inmate operating the inmate media and/or communications device;
- re-verifying, by the inmate media and/or communications device, authentication of the inmate operating the inmate media and/or communications device using the data; and/or
- re-verifying, by the inmate media and/or communications device, that the resultantly verified inmate operating the inmate media and/or communications device is associated with the address identifier of the inmate media and/or communications device.

26. A non-transitory computer-readable storage medium having program instructions stored thereon that, upon execution by an inmate media and/or communications device, cause the inmate media and/or communications device to:
- receive an inbound call from a non-inmate;
- confirm that the inbound calling non-inmate is associated with an address identifier of the inmate media and/or communications device;
- receive, via the inmate media and/or communications device, data associated with the inmate operating the inmate media and/or communications device;
- verify authentication of the inmate operating the inmate media and/or communications device as an inmate to whom the inbound call is directed;
- verify the inmate operating the inmate media and/or communications device is associated with an address identifier of the inmate media and/or communications device; and
- connect the non-inmate inbound call as a result of authenticating that the non-inmate is associated with an address identifier of the inmate media and/or communications device, verifying authentication of the inmate operating the inmate media and/or communications device, and verifying that the inmate operating the inmate media and/or communications device is associated with the address identifier of the inmate media and/or communications device.

* * * * *